H. H. FEFELL & J. F. OHMER.
FARE COLLECTING AND ACCOUNTING MACHINE.
APPLICATION FILED MAR. 19, 1914.
1,255,522.
Patented Feb. 5, 1918.
8 SHEETS—SHEET 6.
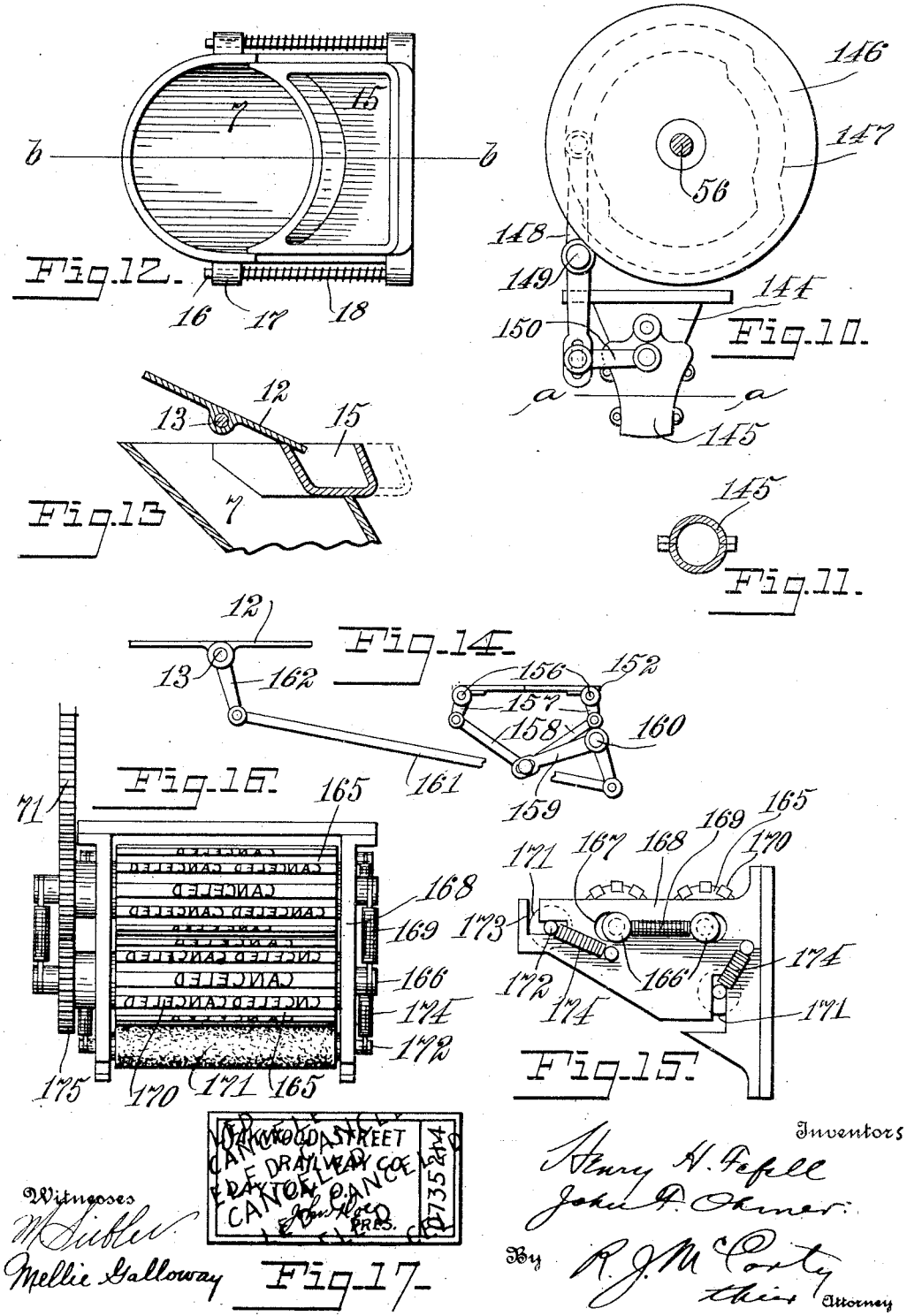

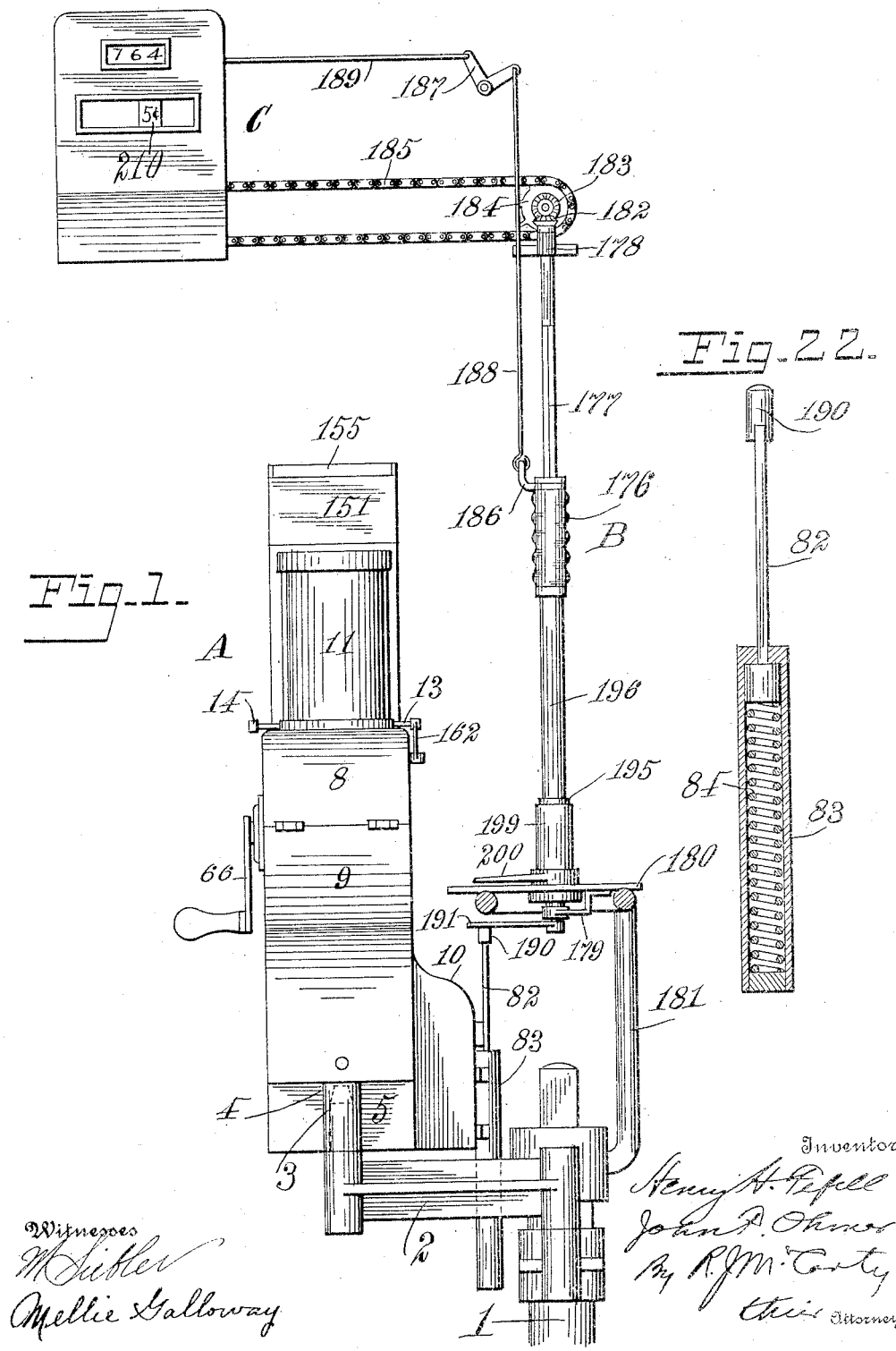

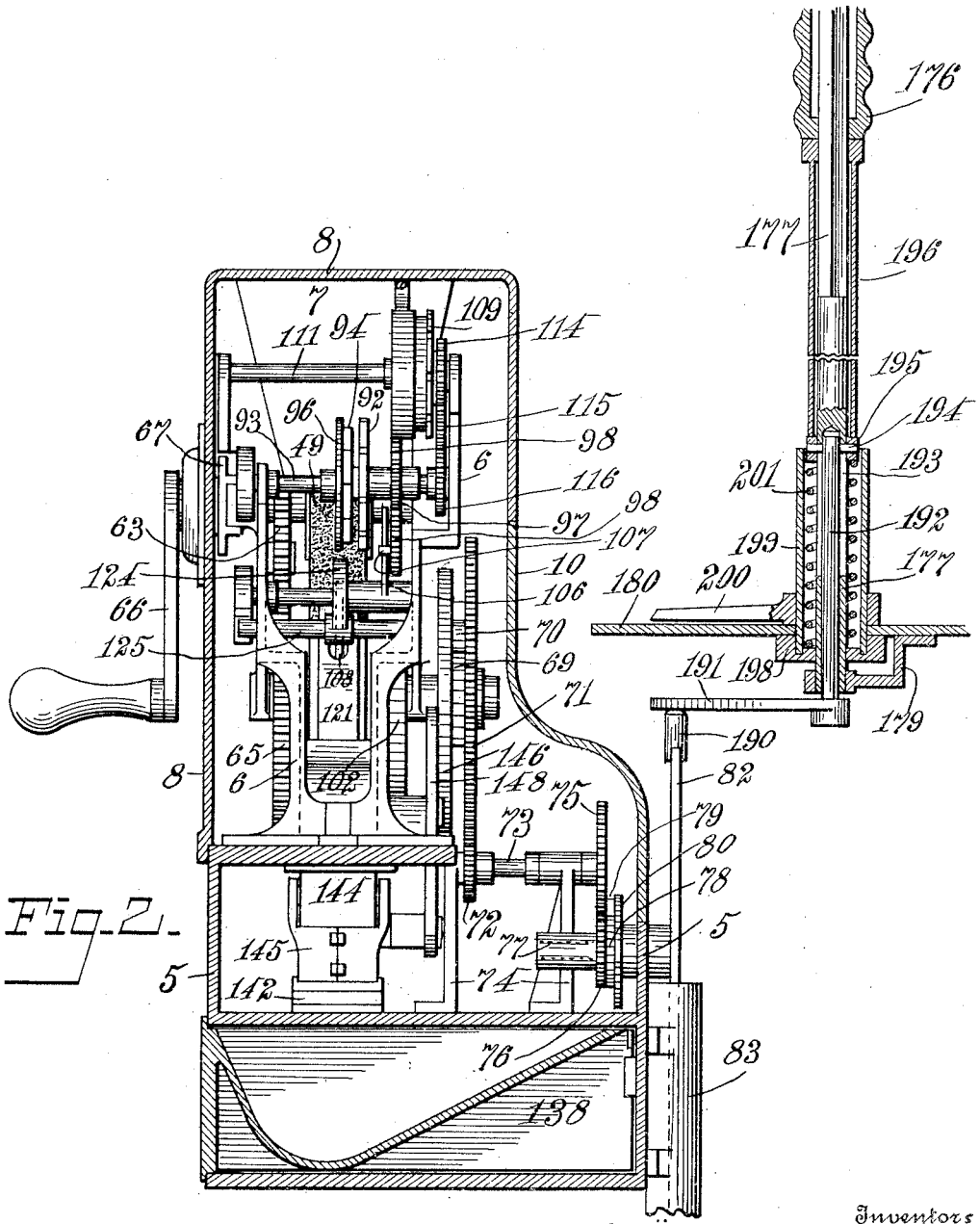

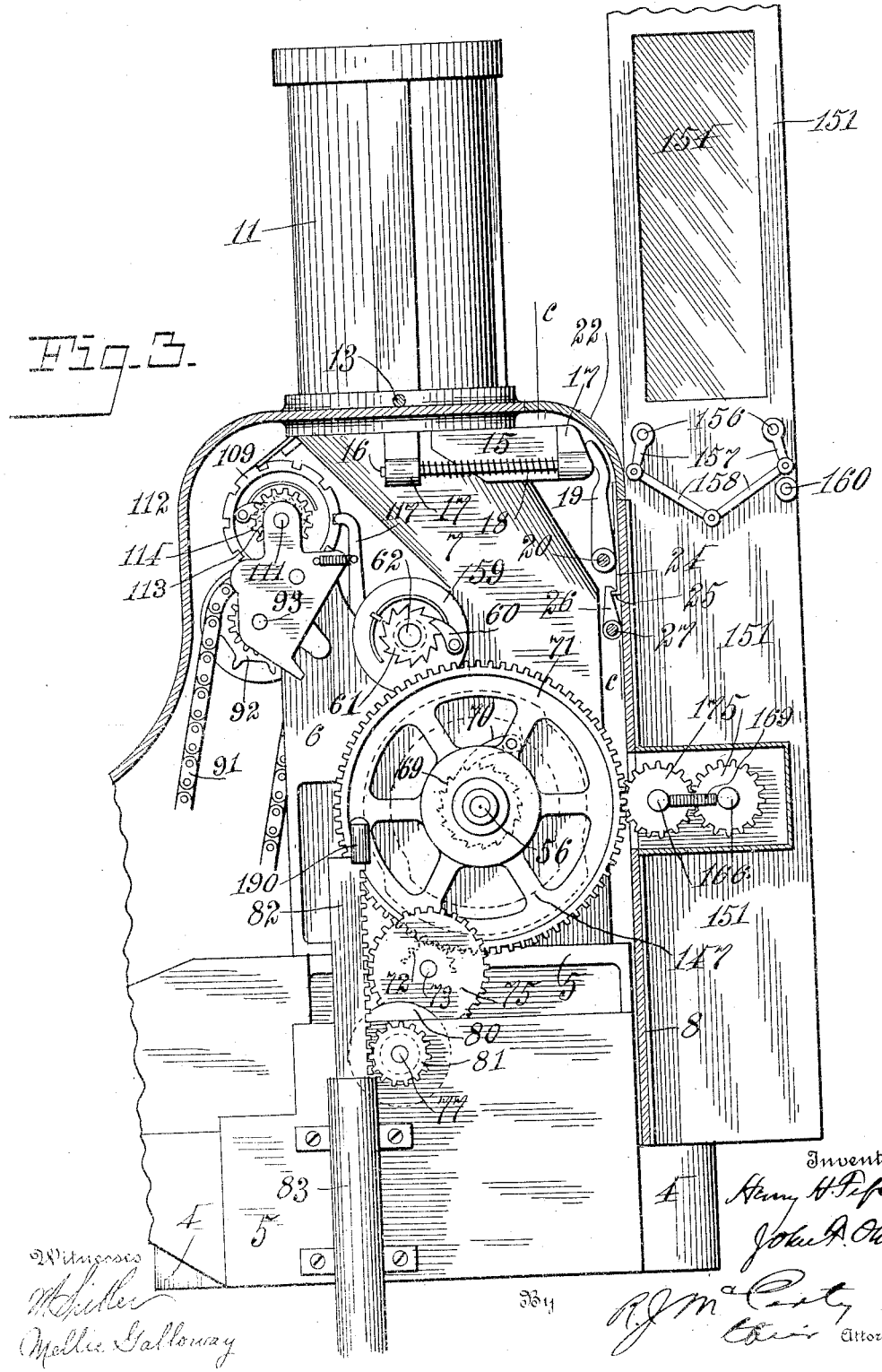

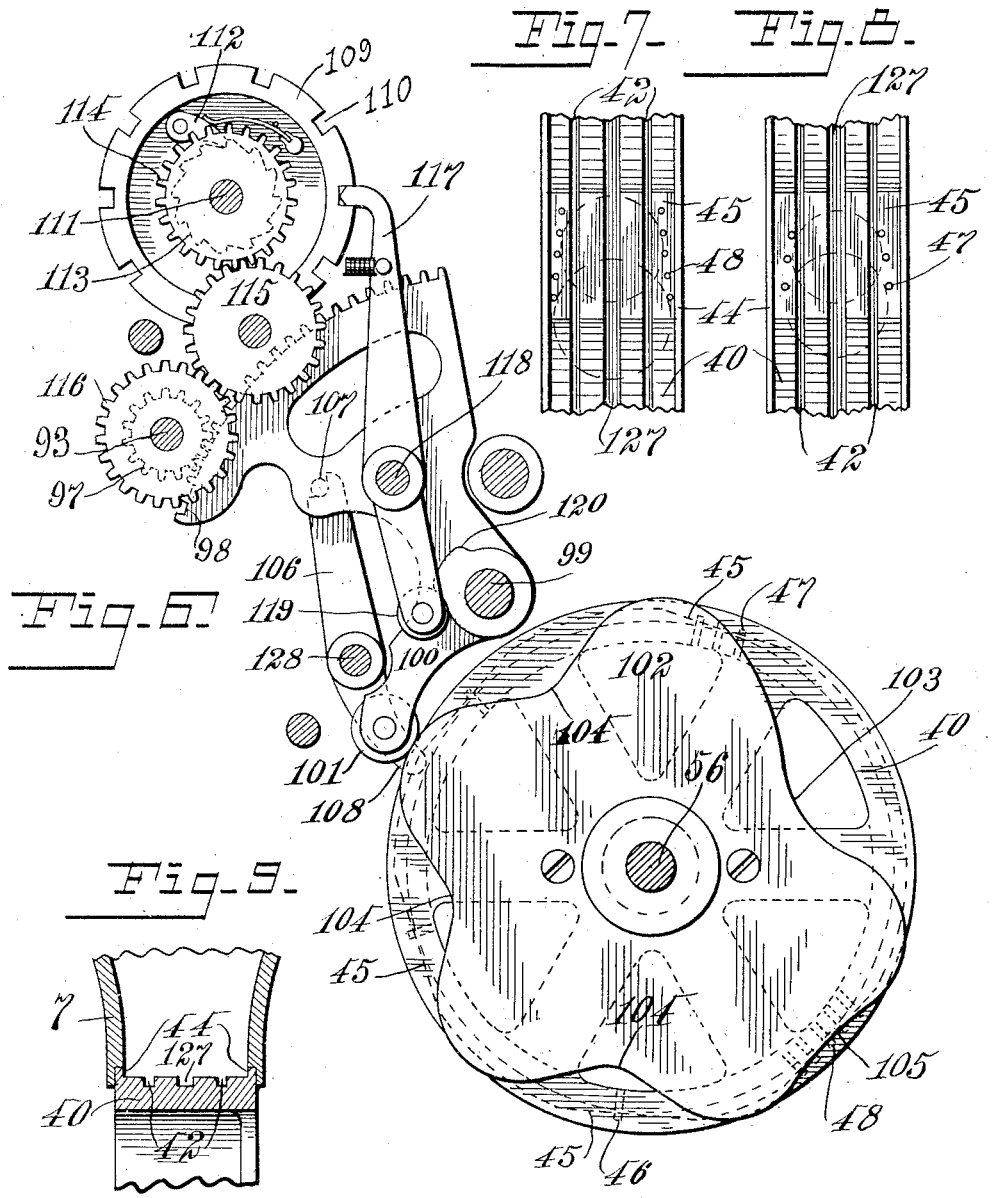

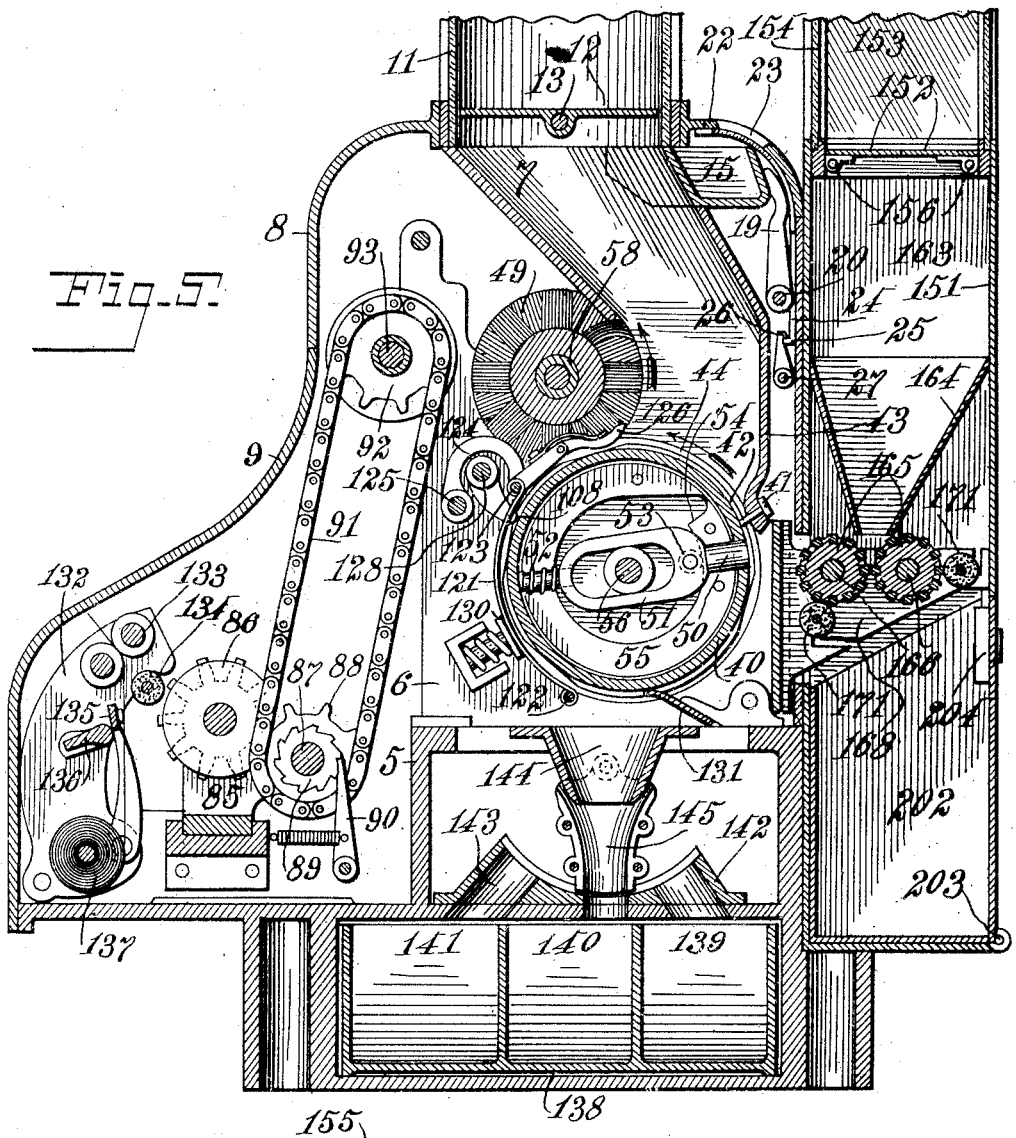

H. H. FEFELL & J. F. OHMER.
FARE COLLECTING AND ACCOUNTING MACHINE.
APPLICATION FILED MAR. 19, 1914.
1,255,522.
Patented Feb. 5, 1918.
8 SHEETS—SHEET 7.
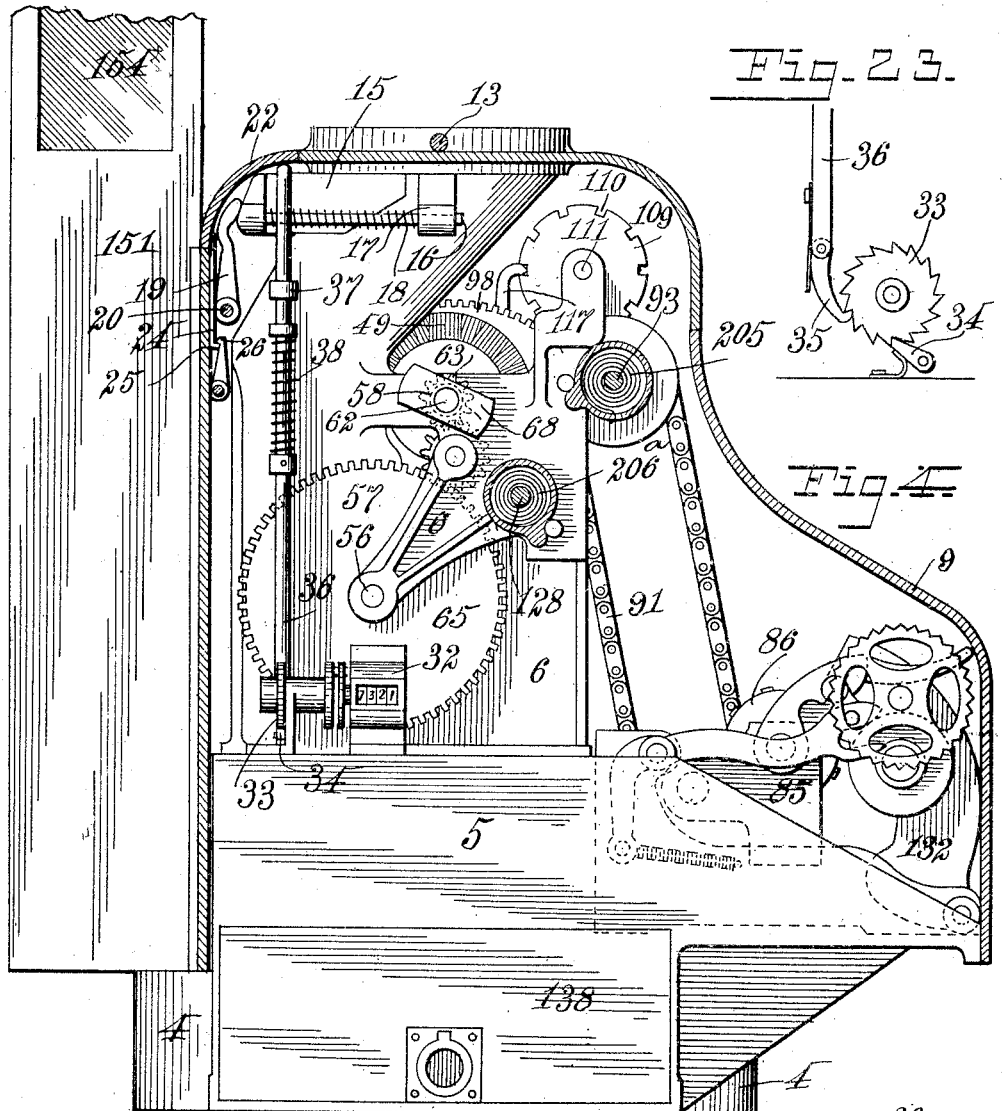
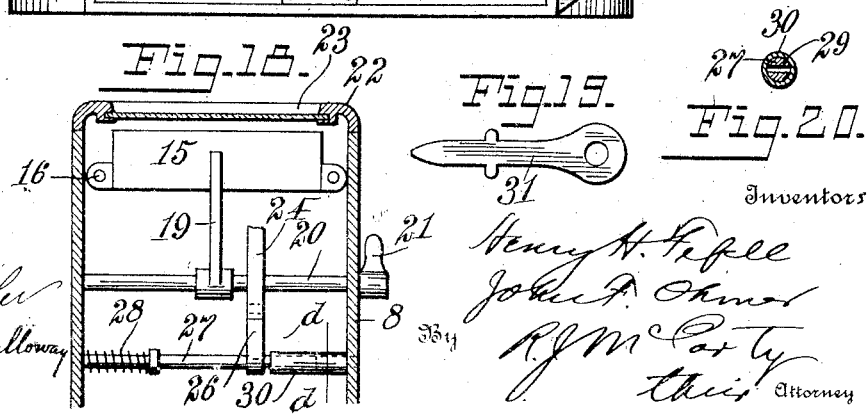

H. H. FEFELL & J. F. OHMER.
FARE COLLECTING AND ACCOUNTING MACHINE.
APPLICATION FILED MAR. 19, 1914.
1,255,522.
Patented Feb. 5, 1918.
8 SHEETS—SHEET 8.
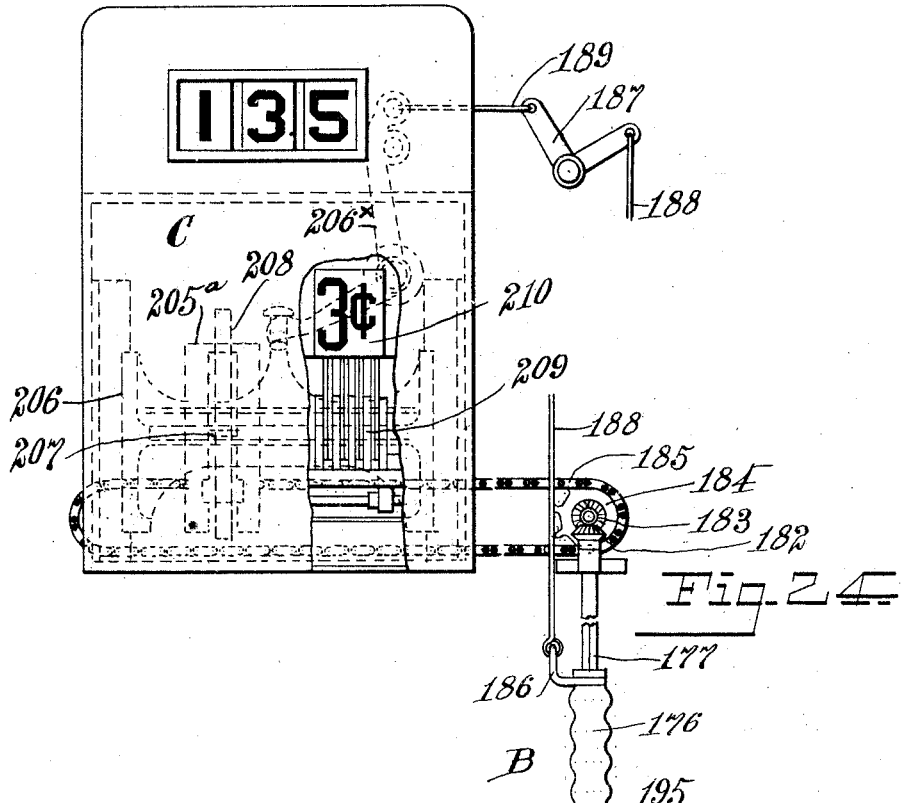
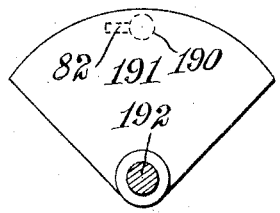
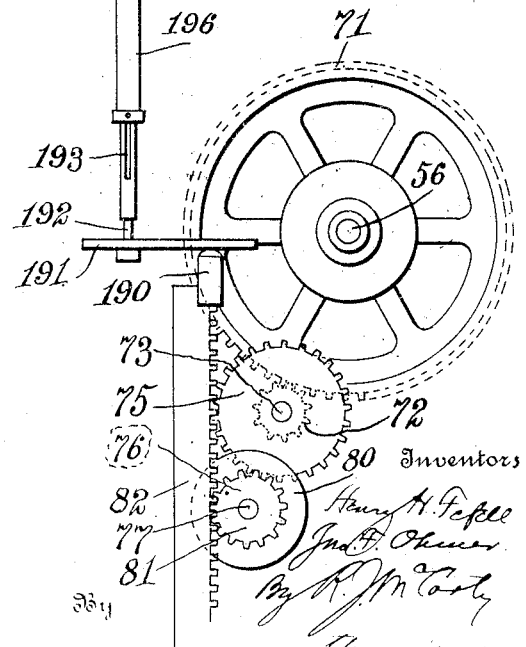

UNITED STATES PATENT OFFICE.

HENRY H. FEFELL AND JOHN F. OHMER, OF DAYTON, OHIO, ASSIGNORS TO OHMER FARE REGISTER COMPANY, OF DAYTON, OHIO, A CORPORATION OF NEW YORK.

FARE COLLECTING AND ACCOUNTING MACHINE.

1,255,522.  Specification of Letters Patent.  Patented Feb. 5, 1918.

Application filed March 19, 1914.  Serial No. 825,840.

*To all whom it may concern:*

Be it known that we, HENRY H. FEFELL and JOHN F. OHMER, citizens of the United States, residing at Dayton, in the county of Montgomery and State of Ohio, have invented certain new and useful Improvements in Fare Collecting and Accounting Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an apparatus for controlling the collections of fares in public conveyances, such for example, as street cars, interurban cars, etc. The invention includes within its scope coin-counting and registering devices and an auxiliary register for recording and indicating all the fares collected by the conductor other than paper fares or those which are usually deposited in a fare box, for example, tickets, transfers and passes. The invention further includes means for canceling the paper fares, such as tickets, transfers and passes, simultaneously with the recording of such fares in the auxiliary register. The coin-counting and registering features or devices embody certain improvements over the coin-counting and registering mechanism shown in our pending application filed October 10, 1913, Serial No. 794,497, as will hereinafter be specifically described.

It has been found, from practical experience, that any type of fare box usually employed on the rear platform of a car or without in the center entrance of a car for the purpose of receiving fares deposited therein, does not afford adequate protection against the unscrupulous fare collector or the unscrupulous passenger who is in the habit of either not depositing anything at all in the box or of depositing something of less value than the fare required or something which is commonly called a "slug." This practice can be indulged in with impunity where there is no public indicator provided whereby passengers in the car may determine just what denomination or rate of fare has been deposited by those entering the car. It is therefore, the primary object of our improvements to combine with a fare box, a fare recorder and indicator which may be located in close proximity to the fare box or at a distant point in the car for recording and indicating the fares deposited in the fare box, and also the fares collected by the conductor which may not be deposited in the fare box. This composite union of a plurality indicating register or recorder and a coin-counting and registering device, makes it necessary for the counter to register the exact amount of each deposit or render himself immediately subject to detection in the event he should make a false registration or neglect to make any registration.

To the foregoing ends, our improvements include coin-counting and registering mechanism, fare register and indicating mechanism and means for canceling tickets or other fare media of a paper character all independently arranged and operating to bring about a unitary result, to-wit, the complete and absolute mastery of the fare collections by the company or companies operating the cars or vehicles in which they are used. These as well as other results are obtained by the means hereinafter described in connection with the accompanying drawings.

Preceding a detail description of the invention and the various devices included within the scope thereof, reference is made in a general way to the drawings. Of these drawings:—

Figure 1 is an elevation showing our improved coin-receiving, counting and registering devices arranged in coöperative relation with a fare registering, recording and indicating machine and fare selective means operatively associated therewith.

Fig. 2 is a vertical longitudinal sectional view of the casing and lower frame work of the machine showing in elevation the coin-counting and registering mechanism and the operating connection.

Fig. 3 is a vertical longitudinal sectional view of the casing and lower frame work showing in side elevation the coin-receiving, counting, and registering mechanisms, and fare box assembled in juxtaposition thereto.

Fig. 4 is a similar view looking on the side opposite that shown in Fig. 3.

Fig. 5 is a vertical longitudinal sectional elevation of the coin-counting and registering mechanism and the fare box. This view of the drawings shows the recording or impression devices and their arrangement relative to the coin-receiving, counting and registering devices and the canceling devices for the paper fares.

Fig. 6 is an enlarged detail elevation of the coin-selector and counting mechanism.

Figs. 7 and 8, respectively, are detail views showing portions of the periphery of the coin-selector wheel which appears in side elevation in Fig. 6.

Fig. 9 is a detail sectional view of a portion of the periphery of the coin-selector wheel showing the marginal flanges thereof.

Fig. 10 is a side elevation of the coin-dropping or distributing devices.

Fig. 11 is a sectional view of the oscillating coin distributer on the line a—a of Fig. 10.

Fig. 12 is a top plan view of the coin-hopper or chute through which the coins are delivered to the selector wheel, shown on Sheet 6.

Fig. 13 is a sectional view of the coin table on the line b—b of Fig. 12.

Fig. 14 is a detail elevation of the lever connections between the fare box or ticket and transfer receptacle and the coin hopper.

Figs. 15 and 16 are detail views of the canceling devices for the paper fares, such as tickets, transfers, etc.

Fig. 17 is a detail view of a canceled ticket;

Fig. 18, Sheet 4, is a vertical sectional view on the line c—c of Fig. 3.

Fig. 19 is a view of the key which enables access to the "slug" drawer.

Fig. 20 is a sectional view on the line d—d of Fig. 18.

Fig. 21, Sheet 5, is a detail view of the upper contracted end of the ticket and transfer receptacle.

Fig. 22, Sheet 1, is a detail sectional elevation of the spring plunger forming the connection between the fare registering and recording mechanism and the coin selector mechanism.

Fig. 23 is a detail view of the "slug" drawer indicator actuator. (Sheet 4).

Fig. 24 is a front elevation showing the various mechanisms operatively connected.

Fig. 25 is a detail plan view of the sector plate showing the shaft in section.

In a detail description of the invention, similar reference characters indicate corresponding parts or elements in the several views of the drawings.

In the drawings, particularly Figs. 1 and 24, A represents the coin counting and registering mechanism much of which is shown in our pending application Serial No. 794,497, filed October 10, 1913, also the fare box or receptacle for the paper fares. B represents the fare selecting means and C represents a fare recorder and indicator of the type shown and described in the patent to John F. Ohmer, et al., No. 694,322, of Feb. 25, 1902. The machine A is mounted upon a stanchion 1 having holding brackets 2 from which pins 3 extend to be received by ears 4 extending from the base 5 upon which is mounted the frame 6 having the coin chute 7. By this arrangement the coin-counting mechanism may be easily removed from operative association with the other mechanism. A casing 8 having doors 9 and 10 surrounds the base 5 and frame 6, said doors enabling access to be had to the interior of the machine A. A coin receiver 11 in which the coins are received is mounted above the chute 7. The coins entering said chute drop upon a tilting table 12 mounted on a shaft 13 journaled in the upper end of the casing 8, and provided with a handle 14 by which it is manipulated. The walls of the coin-receiver 11 are transparent to enable the conductor to view the coins as they lie on the table 12. After having viewed or inspected the coins to detect any spurious article or slugs that may have been placed in the box, the tilting table 12 may be rocked to deposit the coins in the chute 7. However, if any counterfeit or other unacceptable coins or objects are deposited upon the tilting table 12, said unacceptable coins or objects may be separated from the genuine coins and deposited in a "slug" drawer 15. This drawer 15, which is shown in detail in Figs. 12 and 13, Sheet 7, is mounted upon guides 16 which slide in bosses 17 on the sides of the coin chute 7, said drawer 15 being maintained in an outer position by springs 18 supported on the guides 16. When the drawer 15 is moved inwardly, as in Fig. 13, and the table 12 is tilted, any objects deposited on said table will slide into said drawer 15. The drawer 15 is actuated by a lever 19 mounted on a shaft 20 journaled in the casing 8. The shaft 20 is provided with a rocking handle 21 by means of which said drawer may be moved inwardly. Access may be had to said drawer through a lid 22 provided with a window 23 and forming part of the casing 8. The lid 22 is maintained in position by a bar 24 extending therefrom and provided with a lip 25 adapted to be engaged by a hook member 26 mounted on a shaft 27 journaled in the casing 8. (See Figs. 3, 18, 19 and 20). The shaft 27 is provided with a spring 28 which is adapted to hold the hook member 26 in engagement with the lip 25. One end of the shaft 27 is slotted as at 29 and is journaled in a sleeve 30 extending from the casing 8. The slot 29 is adapted to receive a key 31, the possession of which enables access to the "slug" drawer 15. However, to indicate by whom and how many times the lid 22 has been removed and access had to said drawer, a numerical indicator 32 is provided. The said indicator 32 is mounted on the base 5 and is adapted to be actuated through a ratchet 33 provided with a retaining pawl 34 adapted to be actuated by a pawl 35 mounted on the lower end of a plunger 36. (See Fig. 23, Sheet 4.) The plunger 36 is mounted in guides 37 and is pressed upwardly by a spring 38 the upper end of said plunger being normally in engagement with the lid 22. When said lid 22 is removed, the plunger 36 will move upwardly under the influence of the spring 38 thereby actuating the indicator 32 to the extent of one unit. By keeping record of said indicator 32, it may be ascertained who has had access to the "slug" drawer 15, and thereby the conductor is prevented from depositing good coins in the "slug" drawer 15 and afterward securing possession of them by removing the lid 22.

When the coins are deposited in the chute 7, they fall upon a coin selector wheel 40 which forms the bottom of the chute 7. (See Fig. 9, Sheet 6). The wheel 40 selects the various coins individually from an assorted collection such as pennies, nickels and dimes, and carries them around past a counting mechanism and to a coin distributing mechanism. The said wheel 40 is provided with grooves 42 and pins 41 which prevent the coins falling between the wheel 40 and the face 43 of the coin chute. (See Fig. 5). The coin wheel 40 is also provided with flanges 44 shown enlarged in detail in Fig. 9, said flanges being instrumental in preventing the coins becoming jammed or caught between the wheel 40 and the chute 7. The periphery of said selector wheel 40 is provided with flat surfaces 45 upon which the coins rest when being carried around by said wheel. In the present instance, the said wheel 40 is provided with five surfaces 45, one of which is adapted to receive a penny, three of which are adapted to receive nickels, and one of which is adapted to receive a ten-cent coin. The surfaces 45, for the reception of the nickels, which are the largest coins, are provided with pins 46 which are so mounted on their respective surfaces 45 as to permit the nickel coins to lie wholly upon the surfaces 45. Owing to the pins 46 permitting the nickel coins to lie wholly upon said surfaces, the said nickel coins will not subsequently be removed by the rotating brush 49, hereinafter more fully described. The pins 46 are, however, placed a sufficient distance apart to permit smaller coins, such as the pennies and dimes, to pass between the same. The surface 45 for the pennies is provided with pins 48 which are so placed on their respective surface 45 as to permit the larger coins or nickels to extend over the edge of said surface 45 and to be subsequently removed by the brush 49. The pins 48 are so mounted on their respective surface 45 as to allow the pennies to lie wholly upon their respective surface 45, but said pins 48 are placed a sufficient distance apart to permit the smaller coin or dimes to pass therethrough. The dimes or smaller coins are picked up by the selector wheel by pins 47 which are so mounted as to allow the larger coins to extend over the edge of the surface 45 but which permit the dimes to lie wholly upon their respective surface 45. It will, therefore, be seen that means are provided and the selector wheel is so constructed as to permit certain designated portions of the periphery of the wheel to pick up and convey coins of designated value. When the coins extend over the edge of the surfaces 45, they are knocked or brushed off said surfaces by the brush 49, said coins being subsequently picked up by their proper wheel surfaces, the operation being repeated until each coin falls upon its proper surface and is conveyed out of the chute 7. The coins when lying in the bottom of the chute are agitated by a plunger 50 suitably mounted and radially movable in an opening in the periphery of the selector wheel 40. The plunger 50 is mounted on a slotted frame 51 under the control of a spring 52 adapted to snap the plunger outwardly. The frame 51 carries a roller 53 which is adapted to ride off of a shoulder 54 on a ring 55 mounted on the side of the frame 6. The roller 53 rides off of the shoulder 54 when said plunger 50 arrives opposite the lowermost portion of the coin chute 7. The said plunger 50 is adapted to stir up the coins in order that they may be easily picked up by the coin selector wheel 40. The said coin selector wheel 40 is mounted on a shaft 56 journaled in brackets 57 extending from the frame 6. The brush 49 is mounted on a tubular shaft 58 journaled in the frame 6, said shafts 56 and 58 being inter-connected to rotate in unison. As shown in Fig. 3, the shaft 58 carries a dial 59 having a pawl 60 in engagement with a ratchet 61 mounted on a shaft 62 which extends through the tubular shaft 58. As shown in Fig. 4, the tubular shaft 58 is provided with a pinion 63 in mesh with an idler 64. The idler 64 is in mesh with a gear 65 mounted on the shaft 56. The wheel 40 and brush 49 may be rotated by a crank 66, shown in Fig. 2, which crank may be provided with a slotted head 67 mounted in the casing 8, said head 67 receiving a cross piece 68 mounted on the end of the shaft 62. When the crank 66 is rotated in the proper direction, the selector wheel 40 and brush 49 will be rotated in the direction of the arrow shown in Fig. 5, through the agency of the ratchet 61, said ratchet 61, however, permitting said selector wheel and brush to be rotated by other means without the crank being rotated. Mounted on the shaft 56, as seen from Fig. 3, is a ratchet 69 in engagement with a pawl 70 mounted on a gear 71.

As shown from Fig. 2, the gear 71 is in mesh with a pinion 72 mounted on a shaft 73 journaled in bearings 74. The shaft 73 carries a gear 75 in mesh with a gear 76 freely mounted on a shaft 77 journaled in one of the bearings 74 and the base 5. The gear 76 carries a ratchet 78 adapted to be engaged by a pawl 79 mounted on a disk 80 secured to the shaft 77. On its outer end the shaft 77, as will be seen from Fig. 3, carries a gear 81 in mesh with a vertically movable rack 82 mounted in a guide 83 attached to the side of the base 5. The rack 82 is pressed upwardly by a spring 84, as will be seen from Fig. 22. The rack 82 is reciprocated by the spring 84 and the fare selecting means B, hereinafter described. The ratchet 69 permits the selector wheel 40 to be rotated by the crank 66 without rotating the gears 71, 72, 75 and 76, while the ratchet 78 permits the rack 82 to move upwardly without rotating the same gears.

The means for counting and recording the value of the coins conveyed by the selector wheel 40 is as follows:—Mounted upon the base 5 is a cross frame 85 Fig. 5 in which is mounted any well known type of counter 86 provided with a transfer shaft 87 having a sprocket 88 thereon. The shaft 87 is provided with a ratchet 89 and pawl 90 to prevent retrograde movement of the counter. Extending around the sprocket 88 is a chain 91 which also extends around a sprocket 92 freely mounted on a shaft 93 journaled in the frame 6. The sprocket 92 is connected to the shaft 93 through a ratchet 94 and disk 96, the disk 96 being rigidly secured to the shaft 93 as is also a pinion 97. (See Fig. 6). The pinion 97 engages a segment gear 98 mounted on a shaft 99 journaled in the frame 6, said segment gear 98 being provided with an arm 100 having an anti-frictional roller 101 adapted to be engaged by the periphery of a multiple cam 102 attached to the selector wheel 40. The cam 102 is provided with depressions 103, 104 and 105. Depression 103 is adapted to rock the segment gear 98 an extent sufficient to register the value of ten cents on the counter 86; depression 104 to the value of five cents; and depression 105 to the value of one cent. The said depressions 103, 104 and 105 are so placed on the cam 102 as to agree with the surfaces 45. The segment 98 is maintained in an elevated position by a pawl 106 which engages a pin 107 in the segment gear and which is under the control of a spiral spring 206ª, shown in Fig. 4. The pawl 106 is mounted on a shaft 128 and is provided with a trip 108 which normally rides in a groove 127 in the selector wheel 40. The trip 108 is adapted to be engaged by the coins on the surfaces 45 of said wheel to release the pawl 106, to permit the segment 98 to fall, and to thereby rotate the pinion 97 and actuate the counter 86. The extent of movement of the segment 98 and the amount added to the counter 86 will depend upon which one of the recesses 103, 104 and 105 of the selector wheel the roller 101 falls into when the trip 108 is engaged by a coin. The arrangement is such that a respective depression will be opposite the roller 101 when a respective coin engages the trip 108. After said trip 108 is engaged by the coin, the periphery of the cam 102 will elevate the segment 98 during which time the counter 86 is actuated. When the segment 98 falls, the movement thereof is prevented from being transmitted to the counter 86 by the ratchet 94. To lock the pinion 97 and segment 98 in their normal position, a disk 109 is provided. The disk 109 is provided with notches 110 and is mounted on a shaft 111 secured in the frame 6. The said disk 109 carries a pawl 112 in engagement with a ratchet 113 secured to a gear 114, the gear 114 being in mesh with an idler 115 which in turn is in mesh with a gear 116 to which the pinion 97 is secured. The disk 109, therefore, rotates in unison with the pinion 97 when the segment 98 is being elevated. The recesses 110 of the disk 109 are adapted to receive the upper end of a spring-controlled pawl 117 pivoted on shaft 118 and provided with a roller 119 adapted to be engaged by a cam 120 carried by the segment 98. When the segment 98 is depressed, under the influence of the spiral spring 205 shown in Fig. 4, the cam 120 removes the upper end of the pawl 117 out of one of the notches 110 thereby permitting the disk 109 to rotate. The coins, when being carried around by the selector wheel 40, are held in their proper position on their respective surfaces 45 by a resilient band 121, see Fig. 5. The lower end of said band 121 is secured to a pin 122 while the upper end thereof is secured to a pin 123 mounted on a lever 124 fulcrumed at 125. The lever 124 carries a spring-controlled end 126 which normally rides in a recess 127. When a coin strikes the spring end 126, the upper end of the spring band 121 is elevated thereby permitting the coin to easily pass under said band. The band 121 is provided with a suitable opening through which the trip 108 extends and is provided with a spring plunger 130 which is instrumental in pressing the band against the coin and the coin against the selector wheel 40. When the coin reaches the end of the band 121, it falls by gravity or is disengaged from the coin selector wheel 40 by a plate 131 and falls into a coin distributing mechanism hereinafter described.

The counter 86 may be provided with any well known type of printing mechanism consisting of side frames 132, feed rollers 133, an inking roller 134, a platen 135, an actuating cam 136 and a paper roll 137. The coins, after dropping from the selector wheel 40, are not deposited in a single compartment but are separated and deposited in individual compartments there being a compartment for each coin value. See Fig. 5. Slidingly mounted in the base 5 is a till 138 provided with a pocket 139 for the pennies, a pocket 140 for the dimes and a pocket 141 for the nickels. Mounted above said till 138 is a dished member 142 provided with chutes 143 which lead to the various compartments of the till. Swingingly mounted on a receiver or chute 144 is an oscillatable distributer 145 adapted to receive the coins deposited into the receiver and to distribute said coins to the compartments 139, 140 and 141 through the chutes 143. The distributer 145 is oscillated by a cam 146, shown in Figs. 2, 3, and 10. The cam 146 is provided with a race 147 which receives the upper end of a lever 148 pivoted at 149 and connected to the distributer 145 by a link 150. The shape of the cam race 147 and the timing of said cam are such that whenever one of the surfaces 45 passes the lower end of the resilient band 121 the coin distributer 145 will aline with the chutes 143 of the till compartment respective to that surface 45, consequently, if the surface 45, when passing the lower end of the band 121 discharges a coin, the said coin will be deposited in its proper compartment by said distributer. As shown in Fig. 11, the distributer is circular in cross section and thus enables the coins to strike the surface of the distributer only at their edges thereby preventing said coins sticking to the surface thereof, if for any reason said coins should carry any mucilaginous substance.

The means for taking care of paper fares, such as tickets, passes and transfers, is illustrated in several views of the drawings, for example, see Figs. 3, 5 and 16. Mounted on the base 5 along the casing 8 is a casing 151 which is divided into upper and lower compartments by a tilting table 152. The upper compartment 153 is provided with transparent windows in the upper end thereof, as shown in Fig. 21, Sheet 5, and also an opening 155 of a length sufficient to receive paper fares but of a width which prevents coins being inserted. The tilting table 152 is mounted upon rock shafts 156 provided with cranks 157 on their outer ends, as is shown in Figs. 3 and 14. The cranks 157 are connected by toggles 158 which are in turn connected to one end of a bell-crank lever 159 pivoted at 160. The bell-crank lever 159 is connected to the shaft 13 of the coin tilting table 12 by a link 161 and a crank 162. The tilting tables 12 and 152 are, therefore, actuated in unison. The compartment 163 below the tilting table 152 of the fare box is provided with a funnel 164 which directs the paper fares between canceling rollers 165 mounted at the bottom of the compartment 163. The said rollers 165 are mounted on shafts 166 slidingly mounted in slots 167 in brackets 168 extending from the frame 6. The said canceling rollers 165 are drawn toward each other by springs 169 which are connected to the ends of the shafts 166, see Fig. 15. The springs 168 and slots 167 permit said rollers to recede when the tickets are passing between the rollers to receive canceling marks from type bars 170 which are mounted therein and adapted to print on the tickets the word "Canceled" or any other suitable mark, see Fig. 16, Sheet 7. The indication "Canceled" printed on one or both sides of a ticket denotes that the paper fare or ticket has been once received for the payment of or exchange for a fare and thus prevents a paper fare being used a second time, if under any possibility it should be surreptitiously removed from the machine by any unauthorized person. The type bars 170 are continuously inked by inking rollers 171 mounted on shafts 172 slidingly mounted in slots 173 in the brackets 168 and pressed against the type bars by springs 174. The canceling rollers 165 rotate in unison through the agency of gears 175 mounted on the ends of the shafts 166, as will be seen in Figs. 3 and 16, and said canceling rollers are rotated from the gear 71 which is in mesh with one of the gears 175, as will be seen from Fig. 3. After said paper fares pass through the rollers 165, they fall into a receptacle 202 pivoted at 203 to the casing 151 and movable outwardly on said pivot. A lock 204 is provided for said receptacle.

Mounted in any suitable portion of the car in a position to be viewed by the passengers, is a well known type of indicating and recording multiple fare register C such as is shown in the patent issued to John F. Ohmer, et al., No. 694,322, of February 25, 1902. The fares to be indicated and registered therein are selected by a grip piece or handle 176 splined to a shaft 177 and which forms part of the fare selecting means B. The shaft 177 is journaled at its upper end in a suitable bearing 178 and at its lower end in a bracket or arm 179 extending from a plate 180 having the fares indicated thereon, said plate being mounted on a frame 181 extending from the stanchion 1. The upper end of the shaft 177 carries a bevel gear 182 in mesh with a similar gear 183 to which a sprocket 184 is attached. Extending around said sprocket 184 is a chain 185 which connects with a setting mechanism of the register C. In Fig. 24, the chain 185 is shown connected with a carriage 205$^a$ movable horizontally on the actuating device 206 and carrying an actuator 207. The actuator 207 is thus movable with the carriage to any selected one of a series of lifts 208 which actuate a given counter 209 and indicator 210. By rotating the handle 176, the fare to be recorded and indicated in the register C is selected. The said handle 176 is provided with a swivel 186 which is connected to a bell-crank lever 187 by a rod 188. The bell-crank lever 187 is connected to the actuating mechanism 206ˣ of the register C by a rod 189. By depressing the handle 176, the fare thus previously selected is recorded and indicated at said register C. When the said handle 176 is depressed to thus register and indicate the selected fare, the plunger 82 is reciprocated to rotate the coin selector wheel 40. The head 190 of the plunger is engaged by an oscillating plate 191 mounted on the lower end of a shaft 192. The lower end of the fare selecting shaft 177 is provided with a slot 193 through which extends a pin 194 which connects the shaft 192 with a collar 195 attached to the lower end of a sleeve 196 which surrounds the shaft 197 and lies below the handle 176. When the handle 176 is depressed, the sleeve 196, shaft 192, plate 191, and plunger rack 82 are also depressed. Secured to the lower end of said shaft 177 is a collar 198 to which the lower end of a sleeve 199 is attached. The sleeve 199 extends upwardly through the plate 180 and is provided with a pointer 200 which cooperates with indications on the upper side of said plate 180 in selecting the fare to be registered and indicated in the register C, as hereinbefore indicated. The sleeve 190 rotates in unison with shaft 177 and acts as a housing for a spring 201 which exerts an upward influence on the collar 195 and consequently the plate 191, shaft 192 and sleeve 196. The said sleeve 196 is disconnected from and is adapted to be actuated independently of the handle 176, thereby permitting the rack 82 to be reciprocated and the selector wheel 40 rotated without registering and indicating a fare on the register C.

While we have described with some particularity the various features and functions of the mechanisms contributing to the new and useful results obtained, in order to fully comply with the statute, we do not wish, however, to be limited in the matter of unessential details, as it is obvious to those skilled in the art that more or less modification may be made in various details without departing from the spirit and underlying principles of our invention.

Having described our invention, we claim.

1. In a machine of the type specified, the combination of coin-selective mechanism, coin value recording mechanism connected thereto, and ticket canceling devices operated in unison with said coin selective mechanism.

2. In a machine of the type specified, the combination of coin-selective mechanism, coin value recording mechanism connected thereto, ticket canceling devices operable in unison with said coin selective mechanism, and a coin distributer operatively connected to said coin selective mechanism.

3. In a machine of the type specified, the combination of coin-selective mechanism, ticket canceling mechanism operable in unison with said coin selective mechanism, and coin distributer mechanism operatively connected to said coin selective mechanism.

4. In a machine of the type specified, the combination of coin-selective mechanism, coin value registering mechanism connected thereto, and ticket canceling devices operable in unison with said coin selective mechanism.

5. In a machine of the type specified, the combination with coin-selective mechanism, coin-value-registering mechanism, and a coin distributer, of a series of individual indicators slidable in vertical planes and adapted to indicate the values of all the coins received by said coin-selective mechanism and distributed by said coin distributer, means for selecting a specific indicator for operation, and common means for actuating said coin-selective mechanism, said coin-value-registering mechanism, said coin distributer and said indicators.

6. In a machine of the type specified, the combination of coin selective mechanism, a fare indicator, ticket canceling mechanism, and common means for actuating said coin selective mechanism, said fare indicator, and said ticket canceling mechanism.

7. In a machine of the type specified, the combination of coin selective mechanism, fare indicating and recording mechanism, ticket canceling mechanism, and common means for actuating said coin selective mechanism, said fare indicating and recording mechanism and said ticket canceling mechanism.

8. In a machine of the type specified, the combination of coin selective mechanism, coin value registering mechanism, fare indicating and recording mechanism, ticket canceling devices, and common means for actuating said coin selective mechanism, said coin value registering mechanism, said fare indicating and recording mechanism and said ticket canceling devices.

9. In a machine of the type specified, the combination of coin selective mechanism, coin value registering mechanism, a coin distributer, fare indicating and recording mechanism, paper fare canceling devices, and common means for actuating said coin selective mechanism, said coin value registering mechanism, said coin distributer, said fare indicating and recording mechanism, and said ticket canceling devices.

10. In a machine of the type specified, the combination with coin selective and counting mechanisms, an auxiliary fare indicator, an auxiliary fare recorder, means for selecting fares to be indicated and recorded on said mechanisms through a subsequent operation of said fare indicator and fare recorder, and common means for concurrently operating said coin selective and coin counting mechanisms and said fare indicator and fare recorder.

11. In a machine of the type specified, the combination of an auxiliary fare recorder and indicator, ticket canceling devices, selective devices for selecting fares to be recorded and indicated in said fare recorder and indicator, and common means for concurrently operating said fare recorder and indicator and said ticket canceling devices.

12. In a machine of the type specified, the combination of an auxiliary fare recorder and indicator, paper fare and canceling devices, said auxiliary fare recorder and indicator and said paper fare canceling devices being located a remote distance one from the other, means for selecting the value of a paper fare to be recorded and indicated at said auxiliary fare recorder and indicator, and means for concurrently operating the fare recorder and indicator and said paper fare canceling devices.

13. In a machine of the type specified, the combination with a series of individual auxiliary fare indicators, means for selecting in advance of the operation of the machine an indicator to be actuated, coin selecting and distributing devices, and means adapted to concurrently actuate a selected fare indicator and said coin selecting and distributing devices.

14. In a machine of the type specified, the combination with a series of individual auxiliary fare indicators, means for selecting an indicator to be actuated, paper fare depositing and canceling means, and means for concurrently actuating a selected indicator and said paper fare depositing and canceling devices.

15. In a machine of the type specified, the combination with auxiliary fare indicators, coin selecting and distributing devices, ticket depositing and canceling devices, means for selecting a fare indicator to be operated, and common means for actuating said selected indicator, said coin selecting and distributing devices and said paper fare depositing and canceling devices.

16. In a machine of the type specified, the combination of an auxiliary fare recorder and indicator, means for selecting a fare and an indication thereof for operation in advance of the operation of the machine, coin selecting and distributing devices, and means for concurrently operating the fare recorder and indicator, and the coin selecting and distributing devices.

17. In a machine of the type specified, the combination with auxiliary fare indicators, means for selecting and distributing coins according to their values, means for recording the values of the coins selected and distributed, means for depositing paper fares, means for canceling said deposited paper fares, and mechanisms for concurrently actuating a selected fare indicator, said coin value recording means and the paper fare canceling means.

18. In a machine of the type specified, the combination of auxiliary fare indicators, means for selecting in advance of the operation of the machine a fare to be indicated when the machine is operated, a coin selector mechanism, means for counting said selected coins, gearing connected to said coin counting means, a plunger operatively connected with said gearing, and means for concurrently operating a selected indicator and said plunger.

19. In a machine of the type specified, an auxiliary fare counter, an indicator, means for selecting a fare to be recorded on said counter and indicated on said indicator, coin selector mechanism, coin distributing devices including an oscillating chute adapted to distribute the selected and indicated coin into different compartments, and means for concurrently operating a selected fare counter and indicator, and said coin selector and distributing mechanisms.

20. In a machine of the type specified, the combination of a coin receiver, a coin selector receiving coin from said receiver, a paper fare receiver, a pivotal table mounted in said coin receiver, pivotal tables mounted in said paper fare receiver, toggle connections between said tables, common means for actuating all of said tables, an auxiliary fare indicator, and means for concurrently operating said coin selector and said indicator.

21. In a machine of the type specified, a coin receiver, a coin selector adapted to receive coin from said receiver, a ticket receiver, a tilting table mounted in said coin receiver, tilting tables mounted in said ticket receiver, a toggle joint connection between the tilting table of said ticket receiver, a bell-crank lever connected to said toggle joint, and a connection between said bell-crank lever and the tilting table of the coin receiver, whereby all of said tilting tables are actuated in unison.

22. In a machine of the type specified, a coin chute, a table in said chute, a coin selector below said table, gearing for operating said coin selector including a reciprocable rack, a counter to record the selected coin, a plunger engaging said rack, a rotatable member above said plunger, an upright shaft connected to said rotatable member, an auxiliary indicator, and means interposed between said shaft and said indicator, whereby said coin selector and said indicator are concurrently operated through a longitudinal movement of said shaft.

In testimony whereof we affix our signatures, in presence of two witnesses.

HENRY H. FEFELL.
JOHN F. OHMER.

Witnesses:
R. J. McCarty,
John F. Ohmer, Jr.

Copies of this patent may be obtained for five cents each, by addressing the "Commissioner of Patents, Washington, D. C."